United States Patent [19]

Neiger et al.

[11] Patent Number: 6,112,283

[45] Date of Patent: Aug. 29, 2000

[54] OUT-OF-ORDER SNOOPING FOR MULTIPROCESSOR COMPUTER SYSTEMS

[75] Inventors: Gilbert A. Neiger; Nicholas D. Wade; Kai Cheng, all of Portland, Oreg.

[73] Assignee: Intel Corporation, Santa Clara, Calif.

[21] Appl. No.: 09/130,302

[22] Filed: Aug. 6, 1998

[51] Int. Cl.$^7$ .............................. G06F 12/00; G06F 9/38; G06F 15/16

[52] U.S. Cl. .............................. 711/146; 709/213; 712/30

[58] Field of Search .............................. 364/229; 712/30, 712/29; 709/213, 243; 711/134, 136, 146

[56] References Cited

U.S. PATENT DOCUMENTS

| | | | |
|---|---|---|---|
| 5,025,365 | 6/1991 | Mathur et al. | 711/121 |
| 5,604,450 | 2/1997 | Borkar et al. | 326/82 |
| 5,623,628 | 4/1997 | Brayton et al. | 711/141 |
| 5,715,428 | 2/1998 | Wang et al. | 711/141 |
| 5,751,986 | 5/1998 | Fetterman et al. | 711/146 |
| 5,881,303 | 3/1999 | Hagersten et al. | 712/30 |

OTHER PUBLICATIONS

Barroso, Luiz A. and Michel Dubois, "Cache Coherence on a Slotted Ring", Proceedings of the 1991 International Conference on Parallel Processing, Aug. 1991, pp. I–230 to I–237.

Hopper, Andrew and Roger M. Needham, "The Cambridge Fast Ring Networking System", IEEE Transactions on Computers, vol. 37, No. 10, Oct. 1988, pp. 1214–1223.

Neiger, Gil and Sam Toueg, "Simulating Synchronized Clocks and Common Knowledge in Distributed Systems", Journal of the Association for Computing Machinery, vol. 40, No. 3, Apr. 1993, pp. 334–367.

Pierce, John R. "How Far Can Data Loops Go", IEEE Transactions on Communications, vol. Com–20, No. 3, Jun. 1972, pp. 527–530.

*Primary Examiner*—Dung C. Dinh
*Attorney, Agent, or Firm*—Alan Aldous

[57] ABSTRACT

In some embodiments, a computer system includes nodes connected through conductors. At least some of the nodes each include memory and processing circuitry to receive snoop requests in a node reception order and to initiate snoops of the memory in the node before the snoop requests are in a global order. The at least some nodes also each include an ordering buffer to receive the snoop requests and provide them at an output of the ordering buffer in the global order.

26 Claims, 12 Drawing Sheets

OUT-OF-ORDER SNOOPING FOR MULTIPROCESSOR COMPUTER SYSTEMS

RELATED APPLICATIONS

The present application and Appl. Ser. No. 09/130,399 entitled "Passive Message Ordering on a Decentralized Ring" (pending) filed concurrently herewith, have essentially common specifications, but claim different subject matter. The present application and Appl. Ser. No. 09/130,377 entitled "Decentralized Ring Arbitration For Multiprocessor Computer Systems" (pending) filed concurrently herewith, have overlapping specifications, but claim different subject matter.

BACKGROUND OF THE INVENTION

1. Technical Field of the Invention

The present invention relates to multiprocessor computer systems on a decentralized ring that allows out-of-order snooping.

2. Background Art

Multiprocessor computer systems have included buses that allow communication between processors, and between a chipset and the processors (each of which are referred to as nodes). To avoid contention on the bus, a central arbiter, which may be in the chipset, determines which node on the bus may transmit a message on the bus. A message on the bus is broadcast to each node on the bus and each node receives the message essentially at the same time. Therefore, there is no confusion as to the order in which the messages are transmitted.

Ring topologies have been developed in which each node is connected to an adjacent node on a ring. In a point-to-point ring, each node is separated from adjacent nodes on the ring by links (conductors). An advantage of rings are that the drivers of conductors on the ring are loaded only with the receiver circuitry of the particular node, not all nodes on the system. Accordingly, the signals may change state significantly faster.

Each node may transmit messages to each other node, but the messages are passed sequentially from node to node, rather than from a central point to all nodes simultaneously. Accordingly, none of the links can be observed by all the nodes. Ordinarily, a node will not know that another node has transmitted a message until it is received. If more than one node concurrently transmits messages, they will be received in different orders by different nodes. For messages such as snoop requests, this will lead to incorrect results.

Accordingly, there is a need for a system to order messages such that each node orders messages consistently.

SUMMARY

In some embodiments, a computer system includes nodes connected through conductors. At least some of the nodes each include memory and processing circuitry to receive snoop requests in a node reception order and to initiate snoops of the memory in the node before the snoop requests are in a global order. The at least some nodes also each include an ordering buffer to receive the snoop requests and provide them at an output of the ordering buffer in the global order.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

1. Overview

Figure 1:
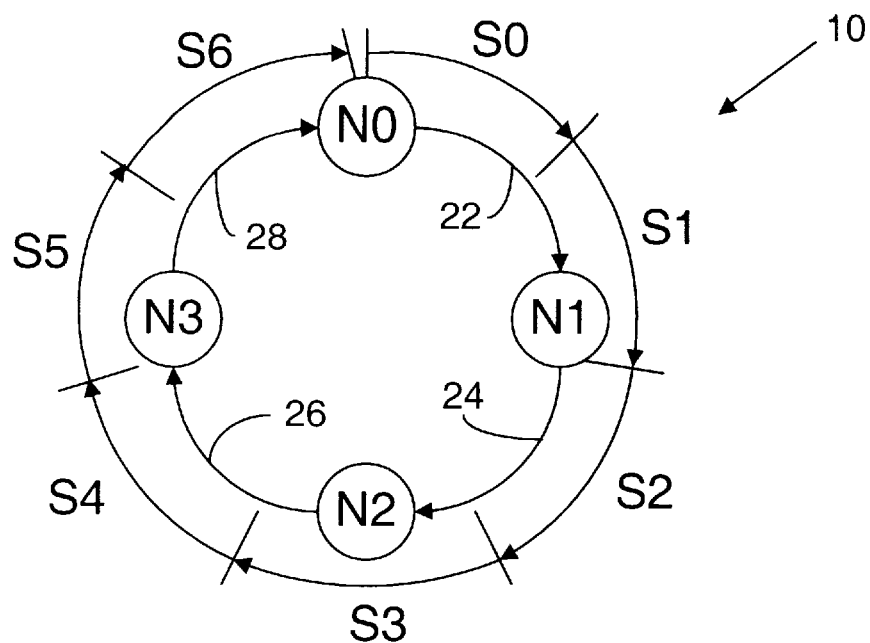
FIG. 1 is a schematic representation of actual distribution of slots in an exemplary embodiment of the invention.

Referring to FIG. 1, an exemplary computer system 10 includes nodes N0, N1, N2, and N3. The nodes communicate with each other through a point-to-point ring topology rather than a shared bus. Signals may be passed between nodes N0 and N1 on conductors 22; between nodes N1 and N2 on conductors 24; between node N2 and N3 and conductors 26; and between nodes N3 and N4 on conductors 28. Conductors 22–28 may each include numerous parallel conductors. Different ones of conductors 22 are used for different purposes, different ones of conductors 24 are used for different purposes, different ones of conductors 26 are used for different purposes, and different ones of conductors 28 are used for different purposes. For example, virtual slots, described below, may be transmitted on only some of the conductors of conductors 22–28. Snoop responses may be transmitted on different conductors than snoop requests. In some embodiments, some signals, such as data signals, are sent on conductors not included in conductors 22–28. FIG. 1 illustrates a unidirectional example in which signals travel only in the clockwise direction. In the example, the nodes do not share a global clock, and use source-synchronous transmission.

Figure 3:
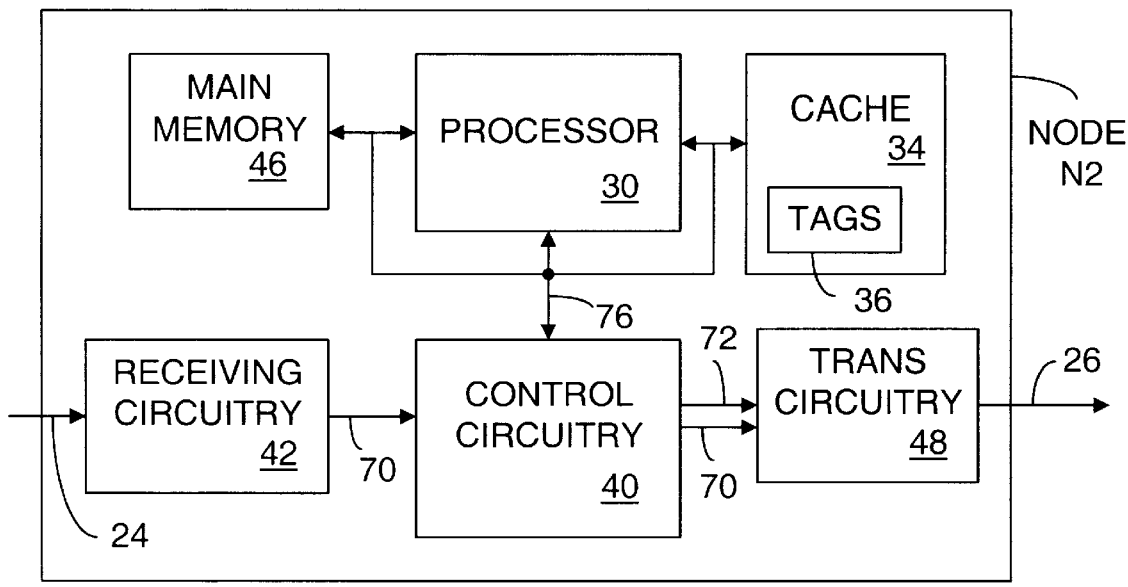
FIG. 3 is a schematic representation of certain circuitry in one of the nodes of FIGS. 1 and 2 in an exemplary embodiment of the invention.

FIG. 3 illustrates an exemplary embodiment of node N2, which includes a processor 30 and a cache 34 (which may be on the same die as processor 30). Node N2 may include more than one processor and/or a chipset to memory and/or peripherals. Processor 30 interfaces with network interface circuitry, which in some embodiments includes receiving circuitry 42, control circuitry 40, and transmitting circuitry

48. Cache 34 may be accessible both through a backside bus to processor 30 and directly to control circuitry 40 as illustrated, or through only one or the other. Main memory 46 is optional and may be part of a shared main memory with other nodes. It may be directly accessible by the processor and/or control circuitry 40. FIG. 3 illustrates receiving circuitry 42 and transmitting circuitry 48 as being separated by control circuitry 40, however, the signals may be rapidly moved from receiving to transmitting circuitry, and in some embodiments, the same circuitry may be used for both. Node N2 may include components not illustrated in FIG. 3. A node may be part of more than one ring. Functions of control circuitry 40 described herein may be performed by processor 30. Nodes N0, N1, and N3 may be the same as or different than N2. Merely as an example, conductors 22–28 each may be on the order of a few centimeters or less in length. As another example, system 10 may be a distributed network where conductors 22–28 are, for example, several meters in length.

Consider the following example in which a processor in node N0 wants to determine whether a cache or other memory associated with processors in nodes N1, N2, or N3 has a particular cache line. A request message (which may be in the form of a packet) is sent on conductors 22 to node N1 requesting whether node N1 has the cache line. Before node N1 determines whether it has the cache line, the message is passed on conductors 24 to node N2 requesting whether node N2 has the cache line. Before node N2 determines whether it has the cache line, the message is passed on conductors 26 to node N3 requesting whether node N3 has the cache line. The message is passed on conductors 28 back to node N0. In the example, the message transmitted by nodes N0–N4, but only originally transmitted by node N0.

System 10 is decentralized in that there is no central arbitrator. In some embodiments, system 10 will mimic a centralized bus-based system so that conventional protocols (such as cache coherence) can be used with little or no change. In many, if not all, bus-based systems, only one agent may insert data onto the bus at a time and all agents see messages on the bus simultaneously and in the same order. In a ring-based system, the agents will receive such packets in different orders. Some embodiments of the invention involve passive message ordering using a virtual slot abstraction by which the nodes may consistently order the messages in a global order.

2. Virtual Slots

In some embodiments, a virtual slot is the unit of ring bandwidth that is sufficient to transport the largest packet or other form of message transmitted in that part of the ring. If such a packet is larger than the number of conductors of the ring available for transmitting messages, it may take more than one clock cycle for an agent to send a packet. The length of a virtual slot is the largest number of cycles used in the relevant conductors of the ring.

The following is an example for system 10, which has 4 nodes. Of course, the invention may be implemented with a greater or lesser number of nodes and with different details. Assume the total delay between a pair of nodes (flight time plus node delay) is 9 clock cycles. Accordingly, it takes 36 clock cycles for a single flit (not a full message packet) to traverse the ring. In a sense, the ring can hold 36 separate flits. Further suppose that it takes 5 clock cycles for a node to send a message packet. Accordingly, the entire ring can hold up to $\lfloor 36/5 \rfloor = 7$ messages at any time. The 36 flits that are traversing the ring are considered as composing 7 virtual slots and 1 unused flit. In the example, the ring capacity is 7 virtual slots.

Figure 2:
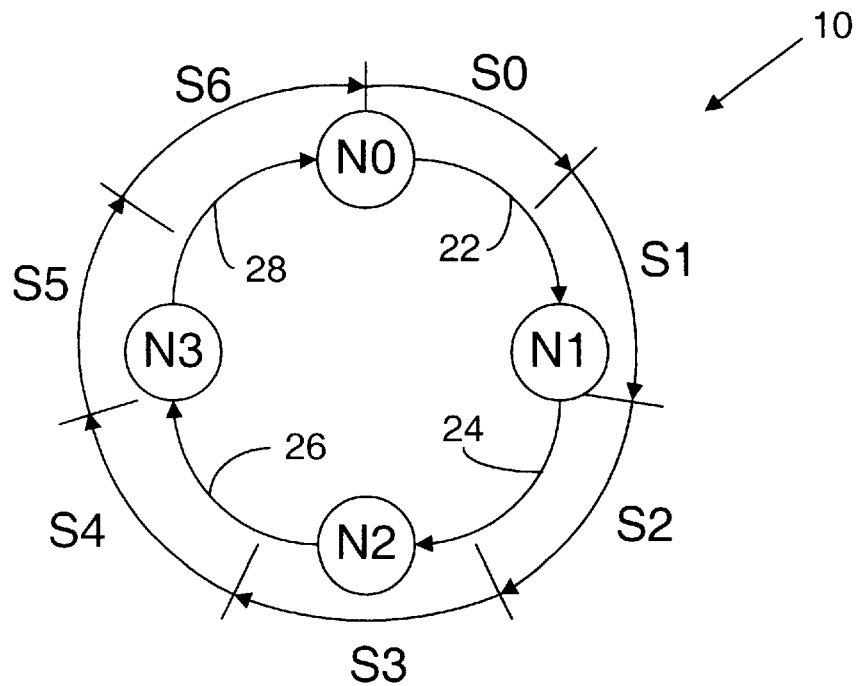
FIG. 2 is a schematic representation of virtual distribution of slots in an exemplary embodiment of the invention.

The 7 virtual slots (S0, S1, S2, S3, S4, S5, and S6) can be visualized as shown in FIGS. 1 and 2. The 1 unused cycle or flit is shown in FIG. 1, but not FIG. 2. FIG. 1 illustrates an actual distribution of message slots and FIG. 2 illustrates a virtual distribution of message slots.

Nodes might not know precisely the various timings used in computing the number of virtual slots in a ring. However, the nodes may know the number c of clocks that it takes to emit a message (c=5 in the example above). Using this, nodes may compute the number of virtual slots in the ring. As an example, consider the following procedure. At system start-up, a distinguished node (e.g., N0) begins emitting flits, which the nodes then cycle around the ring. Each one of these is tagged with an increasing sequence number. Suppose that the node has emitted p flits at the time when the flit labeled 0 returns to it. The node knows that the ring can contain p flits and the number of virtual slots is then $s = \lfloor p/c \rfloor$. This can be communicated to the other nodes.

In some embodiments, once the number of virtual slots has been determined, the distinguished node marks the first (header) message of each virtual slot. A node begins inserting a packet only into a vacant message that is the header of a virtual slot. The distinguished node can put a slot ID on the first flit of each virtual slot, identifying it. The nodes can then look for flits with these slot IDs to determine which flits they can use for their messages. A node will put the first flit of a message only in a vacant flit that is the beginning of a virtual slot.

The number of virtual slots in a ring may change over time (e.g., under changing thermal conditions). The system can be designed either so that it uses fewer virtual slots than are available (allowing for an increase) or so that it periodically reconfigures itself to add or relinquishing slots.

3. Passive Message Ordering

In some embodiments, message ordering is passive in that it requires no communication over and above that which is required to transmit the messages. Node reception order is the order in which messages are actually received by the nodes (which is typically different for each node). Virtual time is incremented as virtual slots move around the ring. Virtual time order is the order of messages according to virtual time. Each message that is originally transmitted at the same virtual time is in the same level of virtual time order. Global order is an order of messages on which each node that is participating in the global ordering agrees. There may be one or more nodes in a ring that do not know what the global order is. For example, a node may be an input/output node where the global order is not relevant and does not keep track of the global order.

Messages are retired from ordering buffer 62 in global order. The messages in the bottom position of ordering buffer 62 is in global order because no message can be inserted in an earlier position in global order. More than one message in ordering buffer 62 may be in global order at a time. Depending on the sending node and number of virtual slots between sending and receiving nodes, a message may be inserted in a position that is already in global order or in a position that will lead to global order as additional messages are received. Where two or more messages are on the same virtual time order level, a tie breaking technique is used to determine which is inserted into an earlier position in ordering buffer 62. Global order may be called bus order in that it provides an order which is similar to, but not necessarily exactly, that which a shared bus would provide. For example, assume message 1 is transmitted from node 1 before message 2 is transmitted from node 2. Message 1 may be placed before or after message 2 in the global order depending on details of the ring and virtual slots.

Global order has the following three properties (referred to as properties (1), (2), and (3)):

(1) If node A sees message m1 preceding message m2 in global order, then all nodes participating in the global ordering see m1 preceding m2 in global order.

(2) If a node first sends message m1 and then sends message m2, all nodes participating in the global ordering see m1 preceding m2 in global order.

(3) If a node receives message m1 in node reception order and later sends message m2, then all nodes participating in the global ordering see m1 preceding m2 in global order.

That the global order does not necessarily follow the precise time order in which messages are transmitted is generally not important as long as properties (1), (2), and (3) are provided.

In addition to properties (1)–(3), the following two additional properties (referred to as properties (4) and (5)) may be useful in certain applications of passive message ordering.

(4) When a node receives message m in node reception order, it knows m's global ordering relative to messages that have already been received.

(5) The receipt of a message at a node does not change the relative global order of messages received earlier.

It should be emphasized that the passive message order may be used in ordering messages for a variety of purposes and systems. For example, passive message ordering may be used to order snoop requests on a ring. As another example, passive message ordering may also by a distributed network of computers to provide a consistent order of messages in a distributed database.

An element of a certain protocols, such as cache-coherence protocols, is that all nodes see all transactions in the same order. With global ordering provided by passive request ordering, all nodes see all transactions in the same order.

a. Virtual Slot Abstraction

The virtual slot abstraction can be used in determining the "virtual time" of message transmission. Messages can be ordered according to this virtual time in an ordering buffer.

i. When Slots Divide Evenly

Suppose that there are s virtual slots in the ring and each slot comprises c flits. If the number of nodes (n), evenly divides s, there can be s/n slots (or sc/n flits) on each link, where s/n and sc/n are integers. This means that it takes sc/n cycles for a flit to travel from one node to another. Nodes can use this information to determine when a message was sent. When a node receives the first flit of a message from an upstream neighbor, it knows that the message was sent u sc/n cycles ago, where u is the number of nodes upstream. If everything is perfectly synchronized, the nodes may agree precisely on the sending time of a message. However, because the system is not perfectly synchronized, the nodes may base their computation, not on clock cycles, but on virtual slots arriving on the ring. Since nodes agree on the structure of the virtual-slot abstraction, the nodes are virtually synchronized.

Nodes do not need to count flits (or "virtual cycles"). It is sufficient to count virtual slots as they come around the ring (the first flit of a virtual slot may be identifiable). When a message arrives at a node, the node can determine that it was sent u s/n slots previous. A node may become aware of its own message at its sending time, knowing that the message was sent 0 slots previous.

The node may keep track of the "age" of a message in units of virtual slots or virtual time. When a message is received from a node u links upstream, the recipient knows that it is us/n slots old and can tag it appropriately in an ordering buffer. As each virtual slot is received, messages are aged by 1 slot each. It is not necessary that the age be expressly stored as a number somewhere in the node. Rather, the node may include circuitry that advances in state as the age increases.

Since no node is more than n−1 links upstream, in some embodiments, u<n, such that us/n<s for all possible u. The oldest message that a node might receive would have age s−1 slots. Thus, once a message has age s−1, a node knows that any subsequently arriving messages will have been sent later in virtual time. Accordingly, ordering of a message in the ordering buffer can be complete when its age is s−1.

ii. When Slots Do Not Divide Evenly

Consider, for example, a ring having 4 nodes that holds 7 virtual slots (n=4 and s=7), as in FIG. 2. In this case, it is sufficient to partition the virtual slots among the links in the ring. Nodes can decide, at initialization for example, which links hold how many virtual slots. In the case of FIG. 2, it may be decided that:

the link from node 0 to node 1 holds 2 virtual slots
the link from node 1 to node 2 holds 2 virtual slots
the link from node 2 to node 3 holds 2 virtual slots
the link from node 3 to node 0 holds 1 virtual slot.

Figure 5:
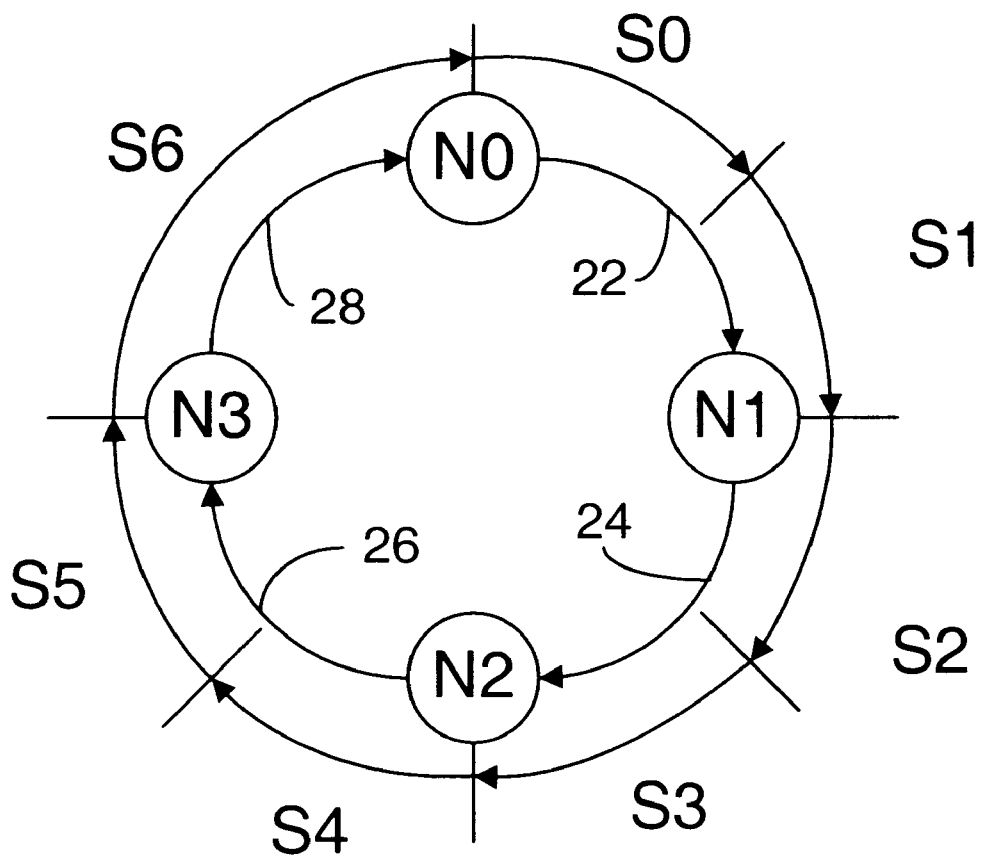
FIG. 5 illustrates assignments of virtual slots to inter-node links as used in an exemplary embodiment of the invention.

FIG. 5 illustrates assignment of virtual slots in inter-node links according to this determination. When the slots do not divide evenly, a slots function may be defined as in Table 1:

TABLE 1

| i | slots(i) |
|---|---|
| 0 | 2 |
| 1 | 2 |
| 2 | 2 |
| 3 | 1 |

The slots function may be used to determine the "age" of a message that is received. In particular, one can derive a function "delay" such that delay(i,j) is the "age" of a message (based on its slot delay) received by node i from node j. It can be computed as delay(i,j)=slots(j)+slots(next (j))+ . . . +slots(prev(i)), where prev(i)=n+i−1 mod n if i≠j, and delay(i,i)=0. For FIG. 5, Table 2, provides a delay function (computation of message delays (in units of slots)):

TABLE 2

| Received | From N0 | From N1 | From N2 | From N3 |
|---|---|---|---|---|
| By N0 | 0 | 5 | 3 | 1 |
| By N1 | 2 | 0 | 5 | 3 |
| By N2 | 4 | 2 | 0 | 5 |
| By N3 | 6 | 4 | 2 | 0 |

For example, Table 2 indicates that the message node 2 receives from node 0 was sent 4 slots ago.

If a particular node is not participating in global ordering, the virtual slot abstraction and associated delay functions will still work, but might may be modified accordingly. For example, if node N1 does not participate, it may still take 4 virtual slots for a message to travel from node N0 to N2, as shown in Table 2.

In some embodiments, when a message is m slots old (where m is the maximum number of slots in the delay function (in the example, m=6)), the messages of any request sent at the same virtual time will have been received. At this point, the ordering can be completed.

Figure 4:
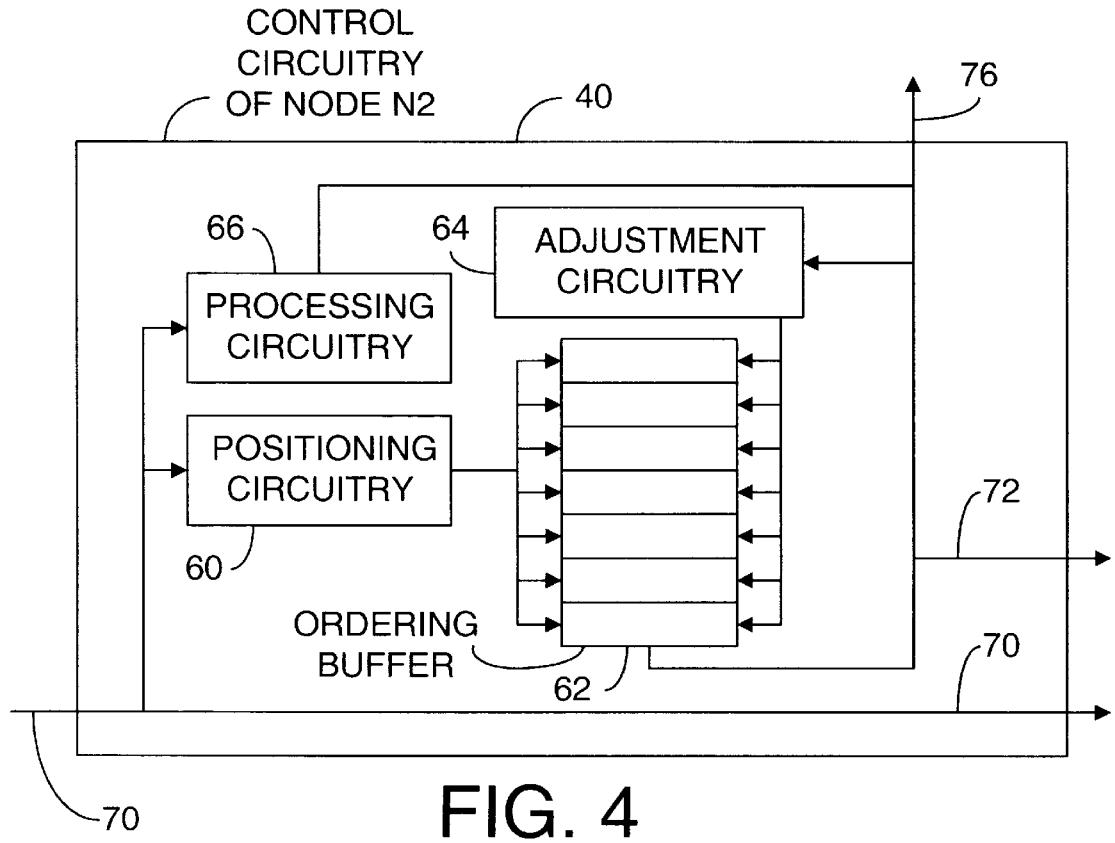
FIG. 4 is a schematic representation of details of the control circuitry of FIG. 3 in an exemplary embodiment of the invention.

FIG. 4 illustrates certain circuitry included in an exemplary embodiment of control circuitry 40 of node N2 of FIG.

3. Referring to FIGS. 3 and 4, positioning circuitry 60 provides a message received by receiving circuitry 42 on conductors 70 or from processor 30 on conductors 76 to an appropriate position in ordering buffer 62. Processing circuitry 66 may performs various functions such as providing messages to processor 39. In some embodiments, processing circuitry 66 initiate a snoop of memory, such as cache 34. Ordering buffer 62 includes a position for each slot on the ring. The positions are arrange in global order, with the highest being latest in global order and the bottom being earliest in global order. Depending on the virtual times at which the messages were original transmitted, more than one position may be in the same virtual time. Positioning circuitry 60 puts the message on the proper initial position based on its virtual time. Then, as new messages are received, the previously positioned messages age and move toward the bottom of ordering buffer 62. (In some embodiments, the messages can age through changes in bits rather than physically changing positions to move toward the bottom of ordering buffer 62.) In some embodiments, it is desirable that certain messages be linked together. For example, certain snoop requests to the same address may be linked through pointers. In some embodiments, positioning circuitry 60 provides these pointers. Also, optional adjustment circuitry 64 may be used to move and/or change data between positions. Messages, which may be adjusted in comparison with the message received by positioning circuitry 60, at the bottom position are in global order, which is agreed upon by each node. The messages are provided to transmitting circuitry 48 through conductors 72 or processor 30 through 76 or other circuitry. In some embodiments, only the bottom position of ordering buffer 62 may hold the retiring message. In other embodiments, any position(s) may hold the retiring message(s). The joining of conductors 72 to ordering buffer 62 represents an output of order ordering buffer 62 for any position holding a retiring message. To avoid clutter and because details are implementation specific, not all control circuitry (e.g., interface circuitry) and related conductors for FIGS. 3 and 4 are illustrated. Note that the messages may be in a different form in ordering buffer 62 than they are when received by processing circuitry 66.

b. Visualization with "Skyline Diagrams"

Figure 6:
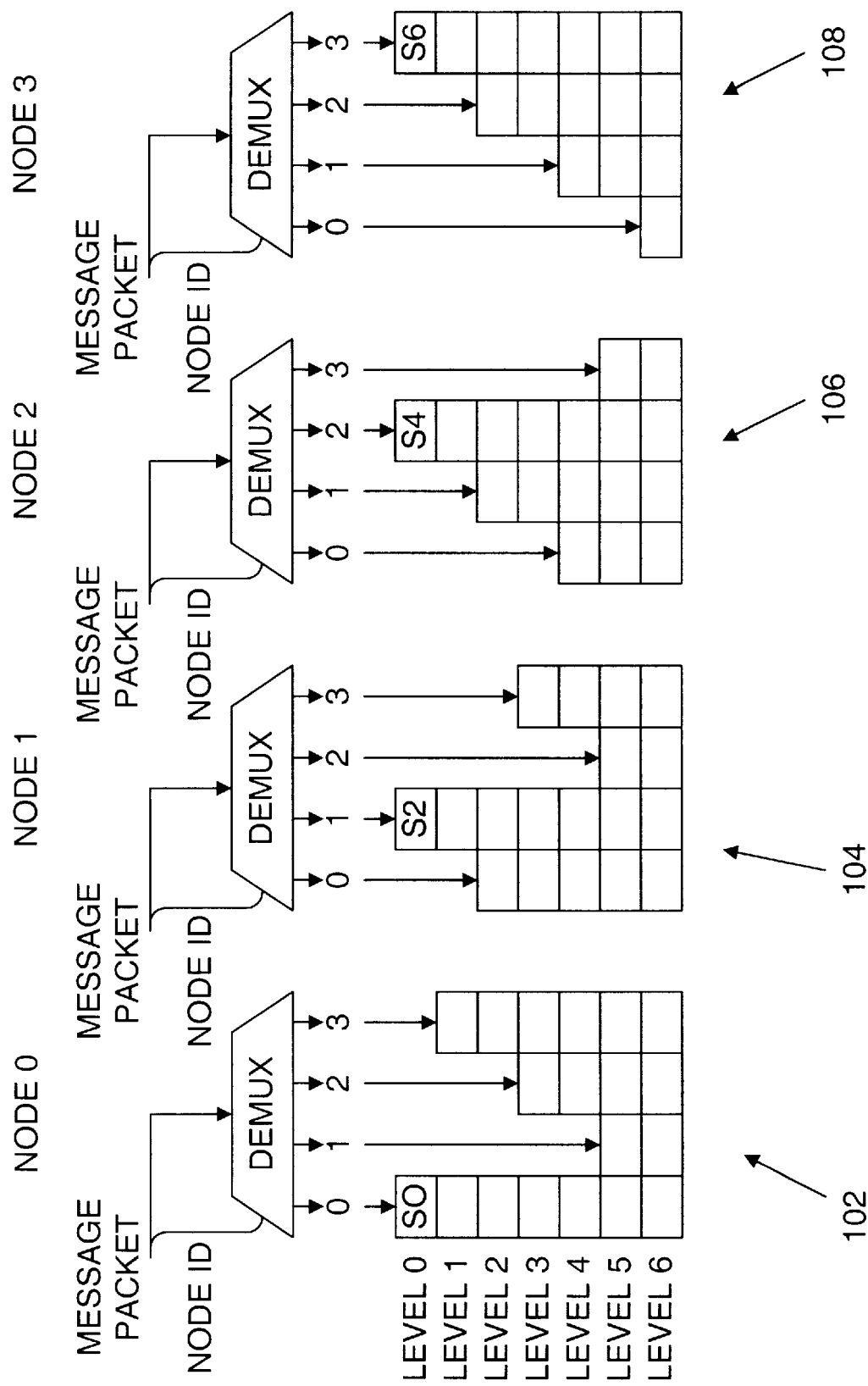
FIGS. 6, 7, 8, 9, 10, and 11 illustrate skyline diagrams and associated circuitry holding data related to particular messages.

The operation of the ordering buffers, such as ordering buffer 62 for node 2, can be visualized by means of "skyline diagrams." FIG. 6 illustrates exemplary skyline diagrams 102, 104, 106, and 108 for nodes 0, 1, 2, and 3, respectively. Accordingly, skyline diagram 106 illustrates the operation of ordering buffer 62 in node 2. Although the skyline diagrams show more than s positions (where s is the number of slots), only s positions may be occupied at a time. The positioning circuitry (e.g., in FIG. 4) includes demultiplexer (DEMUX), similar to that illustrated in FIG. 6, which receive a message and a transmitting node ID number from a slot or the processor within the node. The columns of the skyline diagrams correspond to messages from a different node. The demultiplexer assigns the message to the column that corresponds to the transmitting node ID. That is, column 0 holds messages transmitted by node N0; column 1 holds messages transmitted by node N1; and so forth. The heights of the columns differ and are the number of virtual slots s minus the delay function defined above. For example, the height of column 3 in the diagram for node 1 is s−delay(1, 3)=7−3=4. For ease of description, in the case of a ring with 7 virtual slots, the sections of the columns are referred to as level 0, level 1, level 2, level 3, level 4, level 5, and level 6, although not every column has each level. Messages transmitted at the same virtual time are positioned on the same level, although they are received by the different nodes at different virtual times.

When a message is received, it is placed at the top of the column corresponding to the node that sent the message. With each subsequent slot received, all messages age and drop one level. When a message reaches the bottom, it is s−1 slots old (6 slots old in this example) and the global ordering can be completed through determining which messages having the same slot age will receive priority. Note that it is not necessary that the nodes keep track of the virtual time, such as through a number counter. Rather, the circuitry may merely place messages in the proper position in the ordering buffer and age the other messages by having them move one level. Further, ordering buffer 62 does not need to have all the components of the skyline buffers. For example, the skyline buffers have more positions than there are slots. Ordering buffer 62 has one position for each slot. However, embodiments of the invention may be implemented with ordering buffers different from ordering buffer 62.

i. Example: four slots transmitted at same virtual time

FIGS. 6, 7, 8, and 9 illustrate an example for the ring of FIG. 2. Each node originates transmission of a message in a virtual slot at the same virtual time (VT0). The virtual slots move around the ring, delivering 4 messages in turn. The node reception order is different for each node. Nevertheless, all 4 nodes correctly determine that the 4 messages were sent at the same virtual time.

At virtual time VT0, node N0 originally transmits a message in slot S0, node N1 originally transmits a message in S2, node N2 originally transmits a message in slot S4, and node N3 originally transmits a message in slot S6. However, that fact is not instantaneously known to each node. Rather, the different slots are delivered to ordering buffers of the different nodes at different times. At virtual time VT0, slots S0, S2, S4, and S6 are provided to the ordering buffers of nodes N0, N1, N2, and N3, respectively. In FIG. 6, messages of slots S0, S2, S4, and S6 are received at level 0 of columns 0, 1, 2, and 3 of the skyline diagrams 102, 104, 106 and 108, respectively. Note that in FIGS. 6–10, the symbols "S0," "S2,""S4," and "S6" represent the messages carried in slots S0, S2, S4, and S6. The slots themselves are, of course, not in the ordering buffer.

Figure 7:
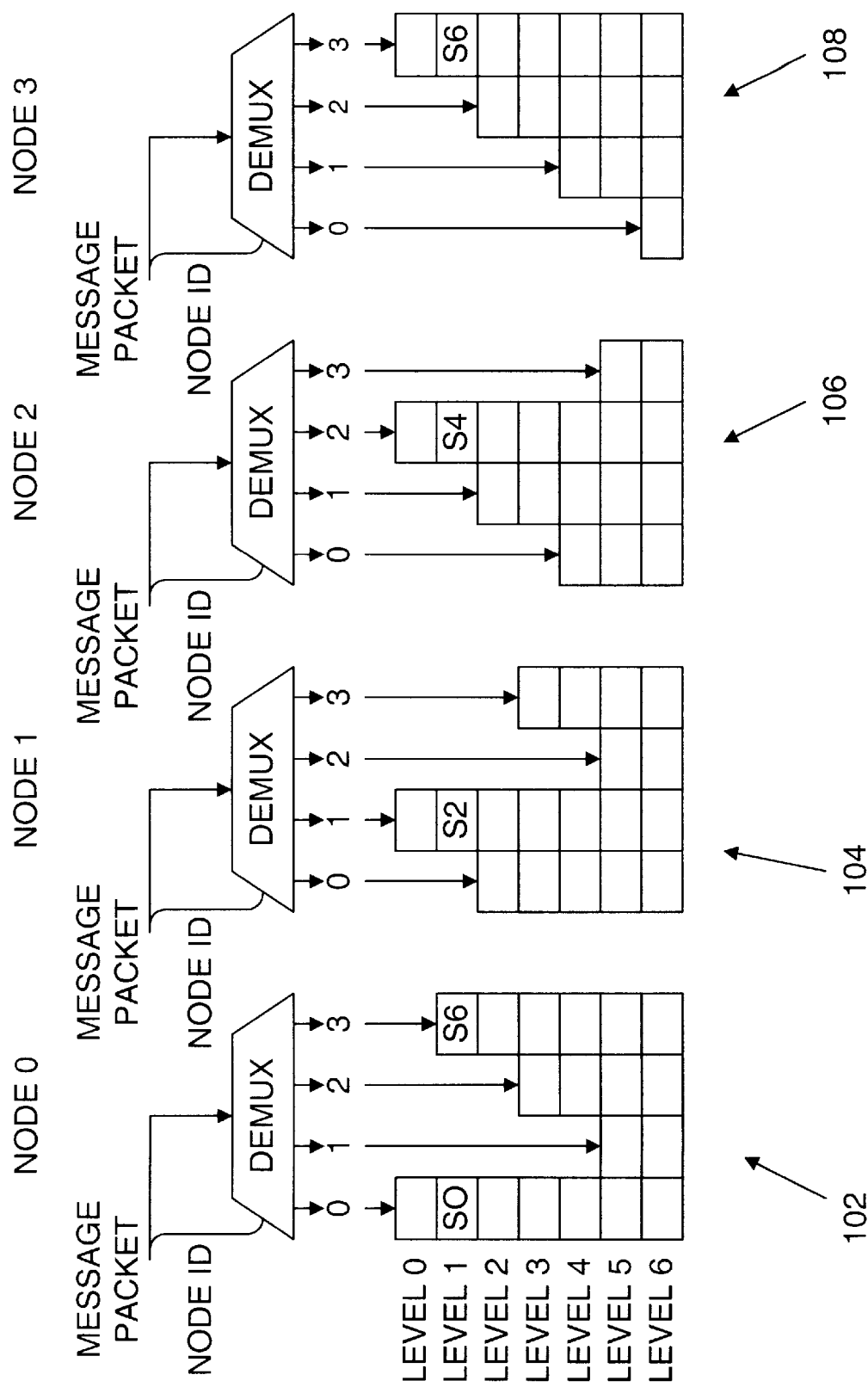

At virtual time VT1, the slots each advanced one level on the ring. That is, slot 0 advances to where slot 1 was at VT0; slot 1 advances to where slot 2 was at VT0; and so forth with slot 6 advancing to where slot 0 was at VT0. As slots enter the nodes, the messages in the skyline diagrams age and move to the next level. Accordingly, as illustrated in FIG. 7, the messages of slots S0, S2, S4, and S6 advance to level 1 of columns 0, 1, 2, and 3, respectively, the skyline diagrams. Also, at virtual time VT1, the message of slot S6 from node 3 is received by the ordering buffer of node N0. The message of slot S6 is placed in column 3, level 1, of skyline diagram 102. Because column 3 is shorter than column 0, the messages of slots S0 and S6 are at the same level in skyline diagram 102 at virtual time VT1. This makes sense since they were originally transmitted at the same virtual time.

With each advance of the slots around the ring, different nodes receive slots originating from different nodes but transmitted at the same virtual time. The messages previously received are advanced down the skyline diagrams as slots move around the ring. The following summarizes which nodes receive which slots from which nodes and where the slot is placed.

At virtual time VT0:
  N0 receives S0 from N0 (message is placed at top of column 0)
  N1 receives S2 from N1 (message is placed at top of column 1)
  N2 receives S4 from N2 (message is placed at top of column 2)
  N3 receives S6 from N3 (message is placed at top of column 3)

At virtual time VT1:
  N0 receives S6 from N3 (message is placed at top of column 3)

At virtual time VT2:
  N1 receives S0 from N0 (message is placed at top of column 0)
  N2 receives S2 from N1 (message is placed at top of column 1)
  N3 receives S4 from N2 (message is placed at top of column 2)

At virtual time VT3:
  N0 receives S4 from N2 (message is placed at top of column 2)
  N1 receives S6 from N3 (message is placed at top of column 3)

At virtual time VT4:
  N2 receives S0 from N0 (message is placed at top of column 0)
  N3 receives S2 from N1 (message is placed at top of column 1)

At virtual time VT5:
  N0 receives S2 from N1 (message is placed at top of column 1)
  N1 receives S4 from N2 (message is placed at top of column 2)
  N2 receives S6 from N3 (message is placed at top of column 3)

At virtual time VT6:
  N3 receives S0 from N0 (message is placed at top of column 0)

Figure 8:
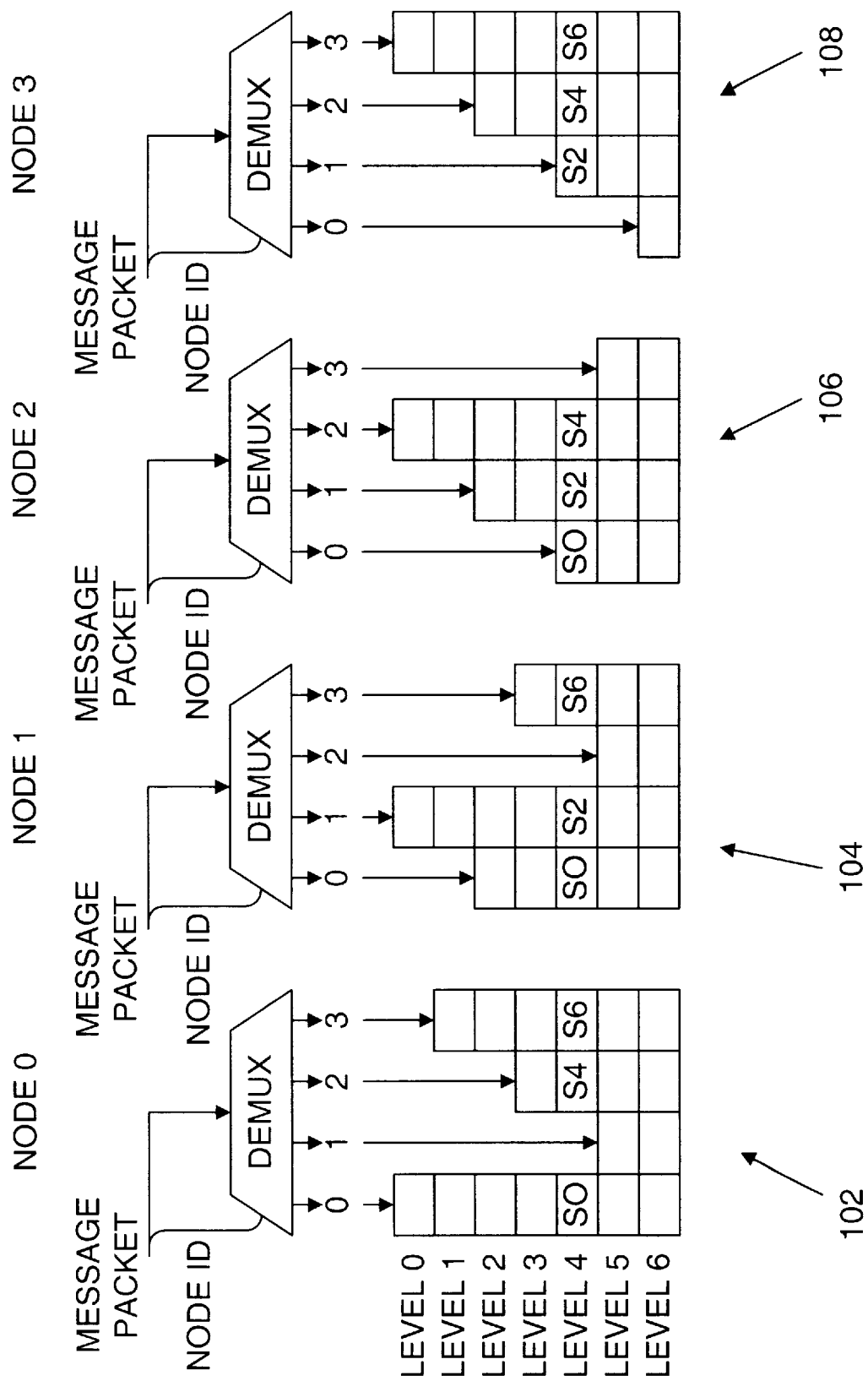

FIG. 8 illustrates the messages in skyline diagrams 102–108 at virtual time VT4.

Figure 9:
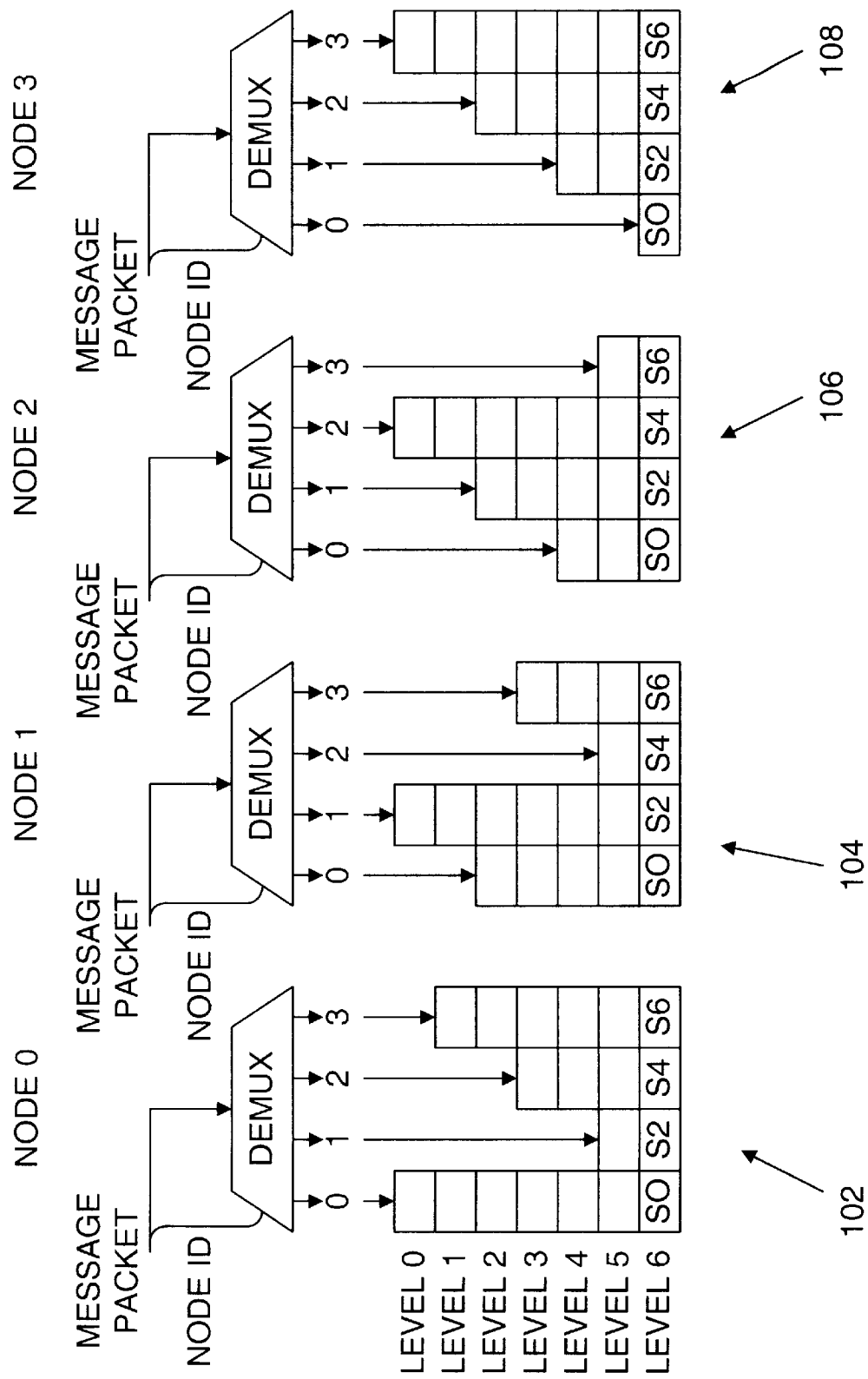

FIG. 9 illustrates the messages in skyline diagrams 102–108 at virtual time VT6. Each skyline diagram has the same combinations of four messages, which makes sense since the messages were transmitted at the same virtual time. Each node uses the same scheme in determining the priority among the messages at the same virtual time. For example, a message associated with a lower node ID could take priority over messages associated with higher node IDs.

Until virtual time VT6, not all of the messages have been received and the global order of the messages is not be known. For example, assuming the message in column 0 takes top priority, ordinarily it will not be known until VT6 whether a message will be received in column 0 of node 3 and if so what that contents of the message will be. Certain techniques may be used to speed up the operation of the nodes. For example, if column 0 has the highest priority and column 3 has the lowest priority, then in the case of node 2, it may would be known at VT4 (at level 4) that the messages of S0, S2, and S4 would be the first three priorities. Assuming that the response to the messages of S0, S2, and S4 does not depend on the contents of the message of S6, node N3 may be able to begin acting on the messages of S0, S2, and S4 prior to VT6. The top priority message can be known for each node at VT5. Indeed all but the message of column 0 of node 3 is known by then. In that case, nodes N0, N1, N2, and N3 may be able to begin acting on the top priority message(s) prior to VT6. However, the nodes may be implemented so that no message is acted on until each message is received in level 6 of the skyline diagrams. Some skyline diagrams may have more than one column with only one position in which case there may be fewer instances when the global order is known before each message is at level 6.

ii. Example: slots transmitted at different virtual times

Figure 10:
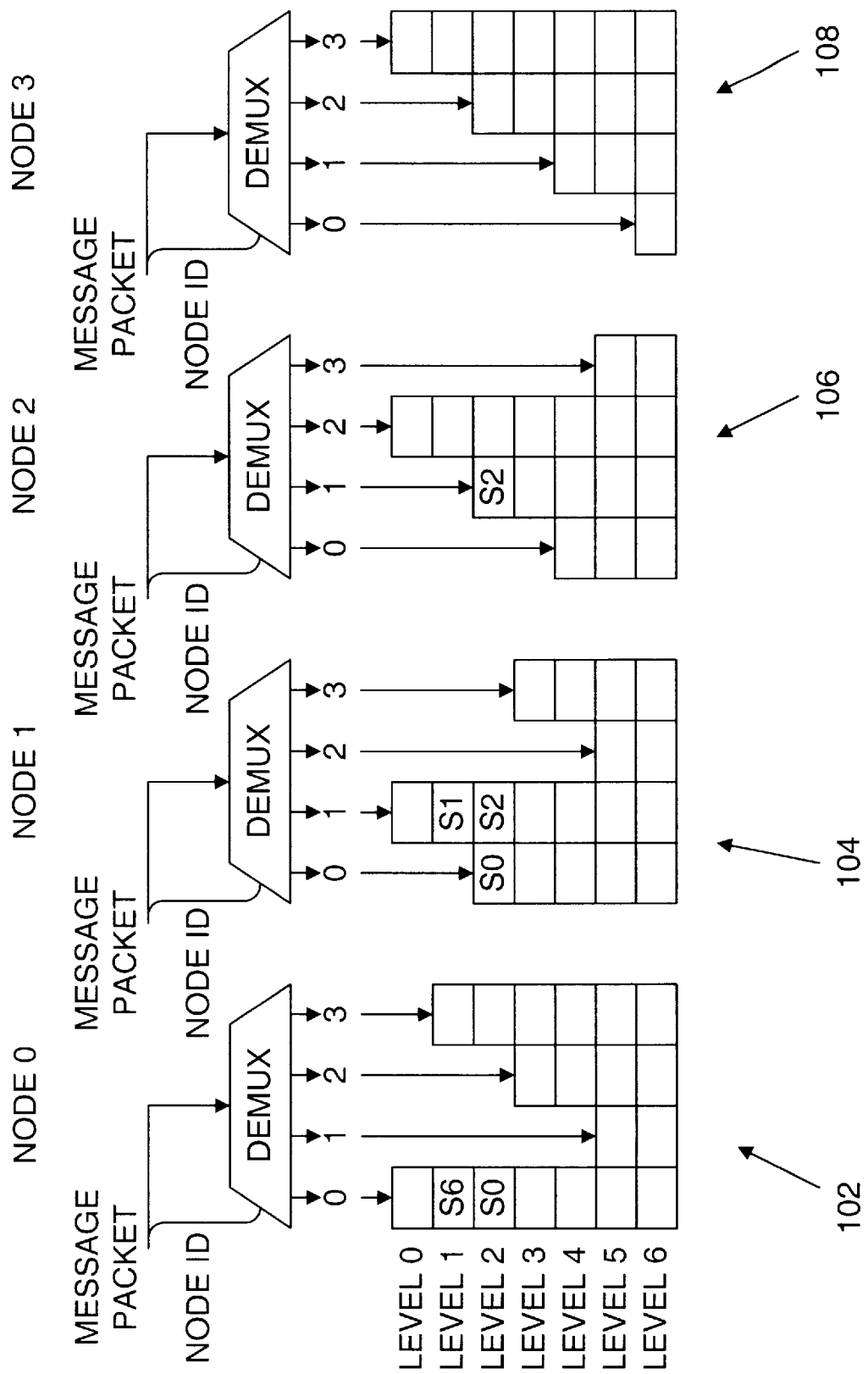

For simplicity, the example of FIGS. 6–9 only illustrates the progression of messages that are originally transmitted at the same virtual time. Messages in slots originally transmitted in different virtual times are positioned on different levels. For example, assume that at virtual time VT0, nodes N0 and N1 originally transmit messages in slot S0 and slot S2, respectively, and at virtual time VT1, nodes N0 and N1 originally transmit messages in slot S6 and slot S1, respectively, but do not otherwise transmit messages. At virtual times VT0 and VT1, the ordering buffers for nodes N0 and N1 receive the messages these nodes originally transmits. The message of slots S0, S1, S2, and S6 age in skyline diagrams 102 and 104 with each advance of the virtual time. At virtual time VT2, column 0 of skyline diagram 104 receives the message of slot S0 and column 1 of skyline diagram 106 receives the message of slot S2. FIG. 10 illustrates the skyline diagrams at time VT2. For simplicity, any other messages are not shown.

4. Out-of-Order Snooping

Snooping of memory, such as caches, is well known. However, when nodes receive snoop request messages in different orders, some mechanism should be used to ensure that each node sees the requests in the same order so that cache coherence is maintained. Out-of-order snooping may be possible on various networks that provides properties (1)–(3). The network need not be in a ring. When the network is in a ring, the passive message order techniques described above may be useful in ordering requests. However, even when a ring is used, techniques other than the above-described passive message ordering may be used to order the requests.

The out-of-order snooping scheme is designed for an underlying communication mechanism in which messages are delivered quickly but in which knowledge of their eventually ordering (relative to each other) may be delayed. Some embodiments of the invention allow initiation of snooping upon receipt of the snoop request, while still maintaining ultimate cache coherence. The invention allows initiation of snooping prior to completion of ordering of the requests.

The detailed technique for out-of-order snooping described below involves properties 1–5 recited above. However, properties 4 and 5 are not required.

It is permissible to perform snoops in node reception order as long as results (both snoop results and writebacks) are distributed in global order. Changes to the tags may be those that would occur had the snoops been performed in global order. All nodes have the same view of memory (cache coherence) and in some implementations, methods of inter-process synchronization (locks, write ordering, interrupt ordering) are preserved. In some implementations, snoop responses include clean (line not found or invalid (I) state), hit (exclusive (E) or shared (S) state), and hitm (modified (M) state), but the invention is not so limited.

The ordering buffer in each node, such as ordering buffer 62, receives snoop requests for various memory line addresses. The case of interest is when there are two or more outstanding requests for the same address.

In some embodiments, when a node receives a request (in node reception order), it is able to order that request with respect to any requests that have already arrived at or been issued by that node. Requests arriving later in time should not affect the relative global order of existing requests.

Table 3 provides certain exemplary cache-coherence transactions and abbreviations that may be involved with snoop requests in connection with the present invention. Of course, other transactions may be used and the invention is not limited to the details of Table 3.

TABLE 3

| Command | Comment |
|---|---|
| BRL | Bus Read Line (not for ownership) |
| BRILO | Bus Read Invalidate Line (BRIL), OWN=1 (Requesting Agent sets line to M state) |
| BILO | Bus Invalidate Line (BIL), OWN=1 (Requesting Agent sets line to M state) |
| BWB | Bus Write Line (BWL), WB=1 (Modified Line WB) |
| BWR | Bus Write Line (BWL), WB=0 (IO device writes line) | a. Overview of the Snoop Process

In some embodiments, as soon as a request is received by a node, a snoop is issued on its behalf. A read-modify-write operation is performed on the cache tags, as is well known. While the new tag state is committed as usual, the snoop result is not immediately returned to the requesting node. Instead, the old tag is stored until the request is globally ordered. At this point, the node can determine what the request's snoop result would be had it been snooped in global order. This result is returned to the requesting node.

In some embodiments, when a snoop is performed and a tag match is detected, the MESI (M, E, S, or I) state in the tag is potentially changed. This change can be viewed as a function f applied to the MESI bits (e.g., new_MESI_bits= f(old_MESI_bits)). Table 4 provides an exemplary invalid MESI function. Table 5 provides an exemplary share MESI function.

TABLE 4

| Inval | New State |
|---|---|
| M | I |
| E | I |
| S | I |
| I | I |

TABLE 5

| Share | New State |
|---|---|
| M | I |
| E | S |
| S | S |
| I | I |

With certain processors of Intel Corporation, Table 5 is changed such that the new state is S where in current state is M.

In some embodiments, a snoop may use an invalid MESI function in response to a BRILO or BILO request and a share MESI function in response to a BRL request. Note that these two functions compose with each other:

inval°inval=inval°share=share°inval=inval;
share°share=share.

The fact that the set {inval, share} is closed under composition means that proper snoop results may be computed after out-of-order snooping has occurred. The fact that it is commutative (inval°share=share°inval) means that, even if snoops are performed out-of-order, the final snoop result will be what it would have been with the correct order. The order in which the snoop operations are performed on the tags is unimportant from the perspective of the final tag state.

b. Detailed Snoop Process

The following are additional details that may be included in some embodiments.

The snoop results are reported as if the snoops were performed in global order. Therefore the original state of the tags (prior to a given snoop) are preserved until it is determined that no more snoop requests could arrive that precede the given snoop in global order. This original tag state is passed to the new snoop, if the new snoop precedes the old snoop in global order.

The modified tag state is passed backwards to succeeding snoop requests in global order after the global order of the snoop request is known. This allows each snoop request to report its result as if they had occurred in global order.

Snoops are performed in atomic read-modify-write sequence in received order.

The original tag state is preserved and passed to snoops requests which hit the same line and arrive later in node reception order but are ordered prior in global order.

A pointer (for linking) to succeeding (global order) snoop requests which hit the same line is maintained so the modified tag state may be passed to succeeding requests in global order.

Table 6, below, provides terms and notation for certain features that may be employed in connection with understanding some embodiments of the invention.

TABLE 6

| Term | Description |
|---|---|
| SSRB: | Self-Snoop Request Buffer: Outstanding requests of a node which have not yet been assigned a global order. |
| SRB: | Snoop Request Buffer. Incoming snoop requests which have not yet been assigned a global order. |
| TAG: | The actual cache tags. |
| Req.Addr: | The address of the current request |
| Req.Cmd | The command (BRL, BWB etc.) of the request |
| Req.Tag | The tag portion of the address of the request |
| Req.Index | The index portion of the address of the request |

With the definitions of Table 6, statements like the following may be understood: if (TAG[Request.Index]= Request.Tag) do_something( ), with respect to the pseudocode below.

Figure 11:
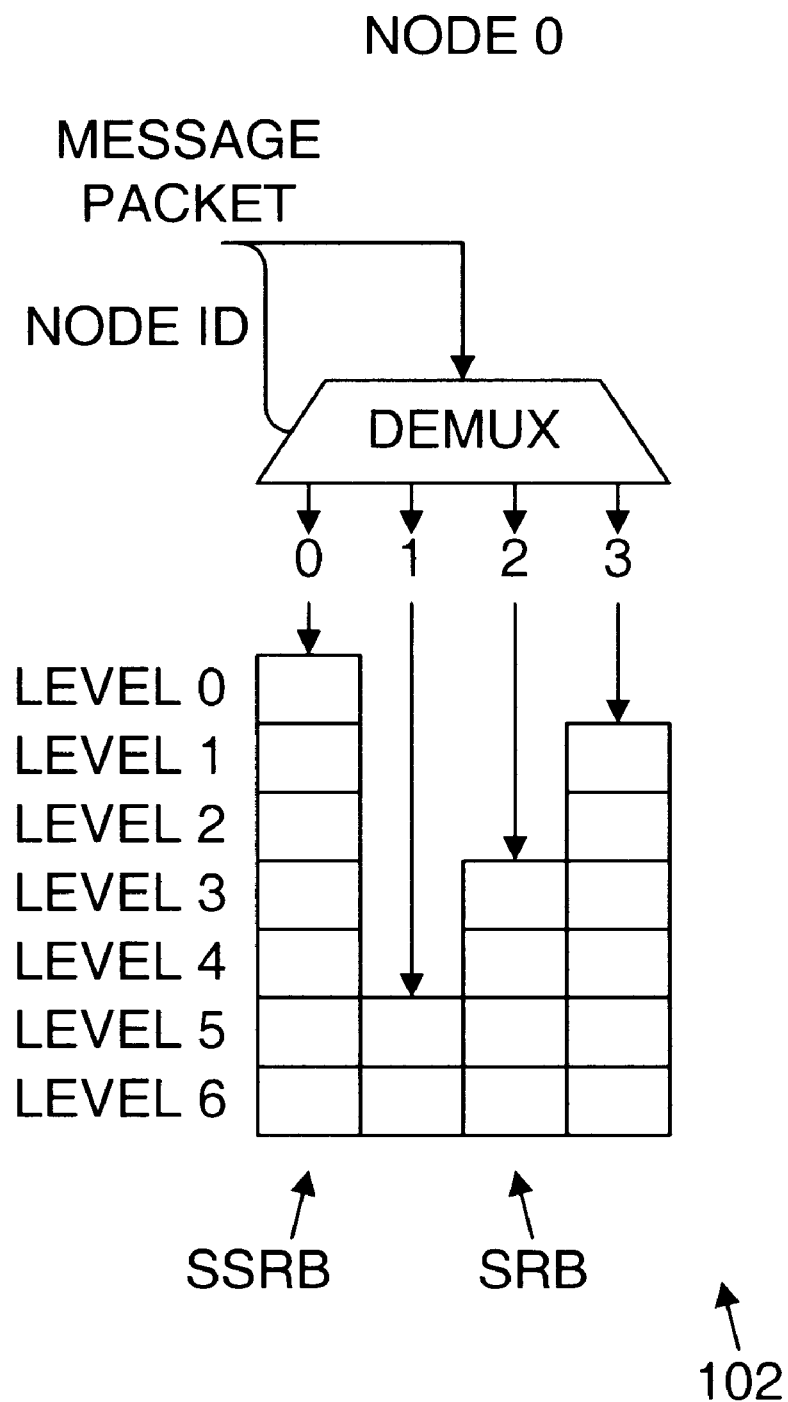

Out-of-order snooping may be performed by the structure used in passive message ordering described above. For example, the SSRB and SRB may be in ordering buffer 62 in FIG. 3. In some embodiments, in the skyline diagrams, the SSRB may be represented by the column that receives requests from the node including the ordering buffer; and the SRB may be represented by the other columns. For example, in FIG. 11 illustrating skyline diagram 102, the SSRB is represented by column 0 and the SRB by columns 1–3. Note that even when a node does not self snoop, snoop requests from that node for other nodes may still be placed in the ordering buffer so that each node will have the same global order. The positions in the requesting nodes' ordering buffer that hold its own snoop requests may or may not be called an SSRB. Positioning circuitry 60 may link snoop requests having the same address through pointers between requests.

In some embodiments, the ordering buffer entries (e.g., the SRB and perhaps the SSRB) may include the fields in Table 7. Not all fields are required and additional fields may be used.

TABLE 7

| SRB Field: | Description |
| --- | --- |
| Valid | Is this entry a "live" entry? |
| Addr | Address of snoop request. Divided into .Tag and .Index fields. |
| Cmd | What type of request (BRL, BWB etc.) |
| Match | Does the current request address hit a valid line in the cache? |
| MESI | MESI bits of tag "before" (global order) snoop was performed. |
| SuccMatch | The index in the SRB of the "successor" (global order), entry with the same address, if any. If not, indication that there is no successor match. |

Figure 12A:
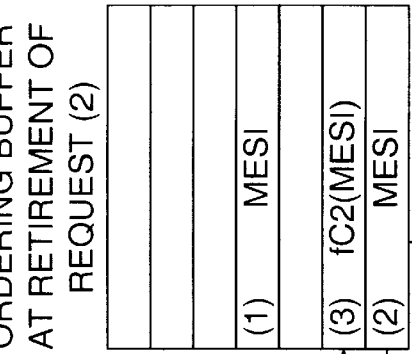
FIGS. 12A, 12B, and 12C show certain MESI states in an ordering buffer at particular times.
Figure 12B:
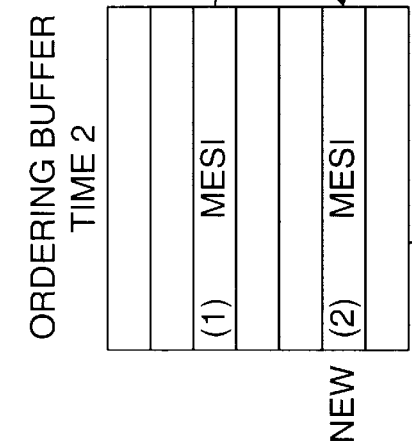
Figure 12C:
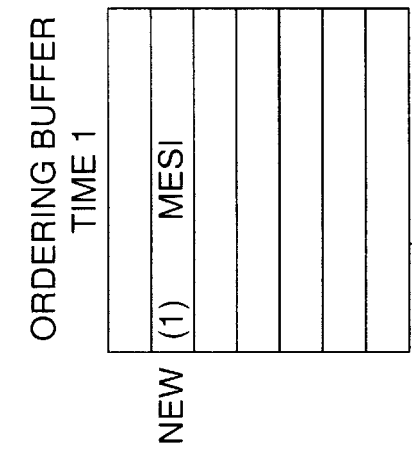
Figure 13A:
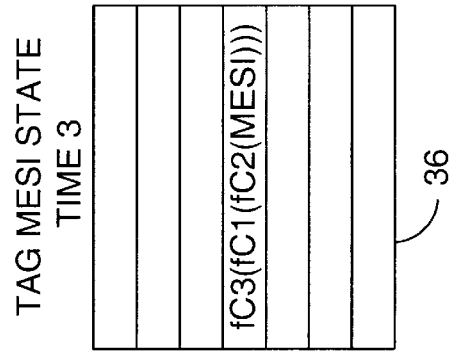
FIGS. 13A, 13B, and 13C show tag states in memory for an address at particular times.
Figure 13B:
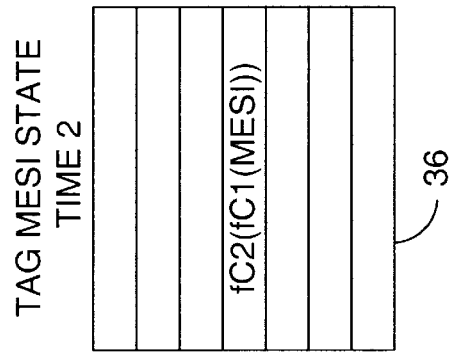
Figure 13C:
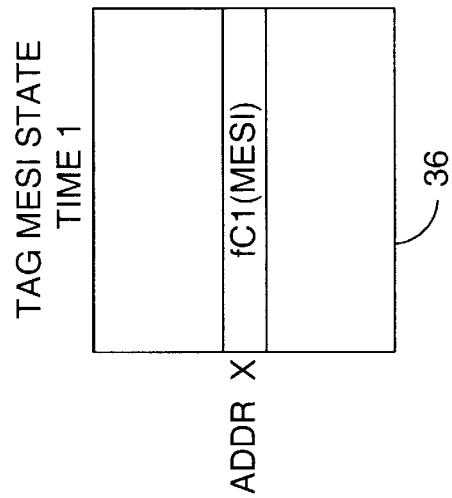

The following describes operation of some embodiments of the invention and is illustrated by an example in connection with FIGS. 12A, 12B, and 12C, showing ordering buffer 62 at times 1, 2, and 3, and FIGS. 13A, 13B, and 13C, showing the MESI state of an address X in a memory tag of tags 36 at times 1, 2, and 3. In node reception order, first a snoop request (1) (including command C1), then a snoop request (2) (including a command C2), and then a snoop request (3) (including a command C3) are received by ordering buffer 62. Requests (1), (2), and (3) are each for address X. Requests for other addresses may be included, but are not shown in FIGS. 12A, 12B, or 12C. Prior to reception of snoop request 1 by ordering buffer 62, address X has either the M, E, S, or I state (written MESI to be general).

The MESI protocol is an example of a cache line coherence protocol. The MESI states in memory tags 36 are examples of memory cache line coherence states, and are represented by memory cache line coherence state bits in tags 36. The MESI states in ordering buffer 62 are examples of ordering buffer cache line coherence states, and are represented by ordering buffer cache line coherence state bits in ordering buffer 62. Tables 4 and 5 are examples of cache line coherence functions. The invention is not limited to use with the MESI protocol, but may be used in connection with other cache line coherence protocols (which may include some or all of the MESI states and perhaps additional cache line coherence states). Depending on the details of other the cache line coherence protocols, tables 4 and/or 5 and/or another cache line coherence function(s) that is closed under composition and commutative may be used.

As a new snoop request for address X is received by a node, it is positioned in the position in ordering buffer 62 that will lead to the global order. Ordering buffer 62 is searched to identify a closest earlier and/or closest later snoop request in ordering buffer 62 that is also to address X (called a closest earlier matching request or closest later matching request). Earlier snoop requests are deemed to happen earlier in global order and are retired from ordering buffer 62 before later snoop requests. Closest means closest in global order. Note that a request may be a closest earlier matching request even if there is only one earlier matching request and a closest later matching request even though there is only one later matching request. A new request points to its closest earlier matching request, if any, and its closest later matching request, if any.

A MESI state is provided to the MESI field for the new request in ordering buffer 62. Where that MESI state comes from depends on whether there is a later matching request. If there is no later matching request, the MESI state (i.e., either M, E, S, or I) in the tag for address X in the memory (e.g., cache 36) is provided to the ordering buffer position for the new request. For example, in FIG. 12A, the MESI state of cache 36 (as it existed prior to time 1) is provided at time 1 to the MESI field of request (1). Note that in the example, times 1, 2, and 3 are not intended to be precise moments but rather ranges of time. For example, the event of FIG. 12A at time 1 may happen before, concurrently with, or after the event of FIG. 13A, which is also at time 1.

If there is a later matching request, the MESI state of the closest later matching request is copied and becomes the MESI state of the new request. For example, in FIG. 12B, the MESI state of request (2) at time 2 is the same as the MESI state of request (1) at time 1. Note that some requests may have an earlier and later matching request. For example, request (3) is both earlier than request (1) and later than request (2). Accordingly, as described in the preceding paragraph, the MESI state in request (1) is copied to the MESI state of request (3). In this way, fresh MESI bits float forward in global order and are included with the retiring request.

In some embodiments, after the time it is assured that the MESI bits of a request cannot change (e.g., when the request is retired from ordering buffer 62), the MESI state of the closest later matching request of the retiring request is updated. The updated MESI state is that which is produced by the appropriate MESI function (e.g., in Table 4 or 5) when the input to the function is the current MESI state in the closest later matching request. Which MESI function is appropriate depends on the command of the retiring request. As noted, a snoop may use "invalid" (Table 4) in response to a BRILO or BILO command and "share" (Table 5) in response to a BRL command. For example, in FIG. 12C, at the retirement of request (2), the MESI state for request (3) is fC2(MESI), meaning the new MESI state for the position of ordering buffer 62 holding request (3) is the result of the MESI state of request (2) before the retirement applied to the MESI function for the command C2. Assuming there are no other requests to address X, when request (3) retires, the MESI state of request (1) would be fC3(fC2(MESI))). In other embodiments, the MESI states of the closest later matching requests are changed each time the MESI state of an earlier request is established as new request are received by ordering buffer 62. In either of the embodiments, the updated MESI states float backward to earlier request. Adjustment circuitry 64 may modify MESI states and move MESI states between positions of the ordering buffer. In the example, fC1, fC2, and fC3 may implement Table 4, Table 5 or similar tables, depending on the commands C1, C2, and C3. For example, if C1 is BRILO, fC1 might implement table 4.

The MESI state in the memory tag (e.g., in cache 62) is updated with the MESI state produced by the appropriate MESI function where the current MESI state in the memory tag is the input to the MESI function. Which MESI function is appropriate depends on the command of the new snoop request. For example, in FIG. 13A, the MESI state for address X at time 1 is fC1(MESI), meaning the MESI state in the memory tag in cache 62 before time 1 is applied to the MESI function for the command C1. In FIG. 13B, the MESI state in the memory tag for address X at time 2 is fC2(fC1 (MESI)). In FIG. 13C, the MESI state in the memory tag for address X is fC3(fC2(fC1(MESI))) at time 3, which may be before or after the retirement of request (2).

In some embodiments, the above described activities in the example of FIGS. 12A–12C and 13A–13C are only performed for requests in the SRB portion of the ordering buffer. For example, only requests in the SRB portion are matching requests. In other embodiments, the activities can be performed for requests in both the SRB and SSRB portions of the ordering buffer.

The MESI state of a request at retirement and the MESI state of the corresponding memory tag are the same regardless of the node reception order the requests.

At retirement, the snoop response (e.g., clean, hit, hitm) is calculated in control circuitry 40 through a function based on the MESI state of the request at retirement and the command of the retiring request. The invention is not limited to any particular type of snoop responses or functions for of calculating the snoop responses. In some embodiments, two of conductors 22–28 are dedicated to carry hit and hitm snoop response signals. Merely as an example, adjustment circuitry 64 could compute the hit and hitm states and supply them to conductors 72. A wire-ORed technique may be used whereby any node may pull a hit or hitm conductor low. If neither hit and hitm are asserted, a clean snoop response is inferred. The snoop responses may be transmitted a fixed duration (e.g., one ring cycle) after the request. The invention is not restricted to any particular implementation of snooping or sending snoop responses. It is not required that each node have memory that can be snooped. From example, the ring may include a node having a chipset without memory to snoop. In such an embodiment, that node may or may node include an ordering buffer. The ordering buffers and positioning circuitry in other nodes would be configured accordingly.

The following pseudocode provides another representation of the snooping operation of some embodiments of the invention. In practice the pseudocode may be implemented through dedicated hardware, software, firmware, some other means, or some combination of them.

```
// function templates
//
// search the SRB for matching entries ordered later in global order.
// returns NULL if no matching entries
SRBindex_t
FindPrevMatch(ReqAddr_t);
// search the SRB for matching entries ordered earlier in global order.
// returns NULL if no matching entries
SRBindex_t
FindSuccMatch(ReqAddr_t);
// returns TRUE if snoop hits valid entry in TAG;
// returns current MESI state
// performs a read access to the TAG
BOOL
SnoopTAG(Index_t, Tag_t, *MESI_t);
// updates the MESI bits in the TAG based on the current MESI and the request cmd.
// performs a write access to the TAG
void
UpdateTAG(Index_t, Cmd_t MESI_t);
// same as UpdateTAG but only computes new MESI bits based on cmd and
// old MESI. Used for updating SRB table entries.
// does NOT perform any access to the TAG.
MESI_t
UpdateMESI(Cmd_t, MESI_t);
// returns the snoop status for this combination of MESI state and cmd
SnoopStat_t
SnoopStatus(Cmd_t, MESI_t);
// allocate a new SRB entry and search for matching addresses
SRBindex_t  CurrReq;
// CurrReq is index of next available entry in the SRB.
// The code to manage CurrReq is not included here.
SRB[CurrReq] = Req; // assigns all fields of request to SRB entry
SRBindex_t  PrevMatch = FindPrevMatch(Req.Addr);
SRBindex_t  SuccMatch = FindSuccMatch(Req.Addr);
//     perform read-modify-write on tags in ring order
SRB[CurrReq].Match = SnoopTag(Req.Index, Req.Tag, &SRB[CurrReq].MESI);
if (SRB[CurrReq].Match) {   // snoop hit
        UpdateTag(Req.Index,SRB[CurrReq].MESI);
}
        // update SRB fields
if (PrevMatch) {
// there is a matching request earlier in global order
// MESI bits with be passed back when earlier snoop retires
SRB[PrevMatch].SuccMatch = CurrReq;
}
if (SuccMatch) {
// there is a matching request later in global order
// point to prev request, and usurp MESI bits,
// in this way the original MESI bits "float forward"
// in global order.
SRB[CurrReq].SuccMatch = SuccMatch;
SRB[CurrReq].MESI = SRB[SuccMatch].MESI;
}
// when global order is established and SRB entry is "retired", we report the snoop status and transfer the
// resulting MESI state to the succeeding matching entry, so it can correctly report its snoop status. In this
```

-continued

```
// way the updated MESI bits "float backward" in time as entries are retired. "Retire" points to SRB entry to
// be retired in global order next. The code to manage the Retire index is not included here.
SRBindex_t  Retire;
SnoopStat_t  SnoopPhase = SnoopStatus(
               SRB[Retire].Cmd,
               SRB[Retire].MESI);
SRB[SRB[Retire].SuccMatchIndex].MESI = UpdateMESI(
SRB[Retire].Cmd,
SRB[Retire].MESI).
```

5. Bi-directional signaling

Types of bi-directional signally on the ring include (1) using different conductors for different directions and (2) using the same conductor for both directions. See, for example, U.S. Pat. No. 5,604,450 to Borkar et al. Under one technique for using the same conductor, both nodes know they other node sent a logic high signal if the conductor remains high and both nodes know the other node sent a logic low signal if the conductor remains low. Each node knows the other node sent a signal with a different state if they conductor changes to a different voltage (e.g., ½ VDD), where VDD is high. The receiving node may change its receiver circuits from VDD/2 to VDD/4. Other schemes may be used for bi-directional signaling. Details of bi-directional signaling and selection of directions can be chosen to enhance speed of delivery and balance performance.

Figure 14:
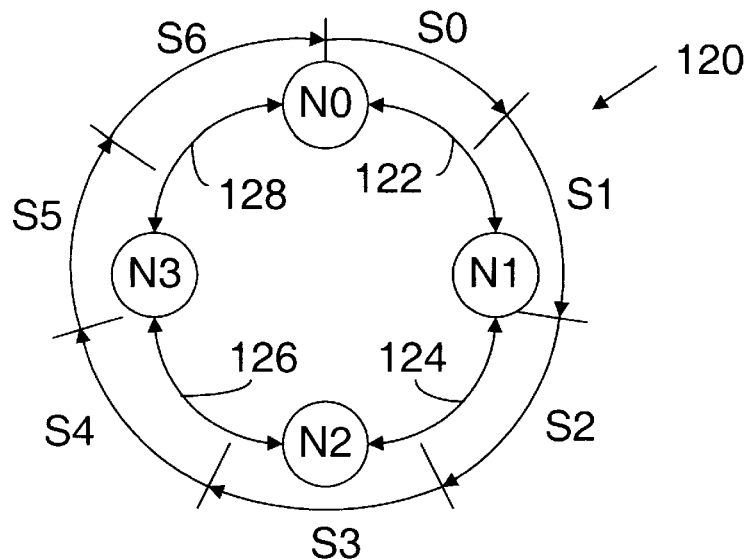
FIG. 14 is a schematic representation of virtual distribution of slots in an exemplary embodiment of the invention including simultaneous bidirectional transmission between nodes.
Figure 15:
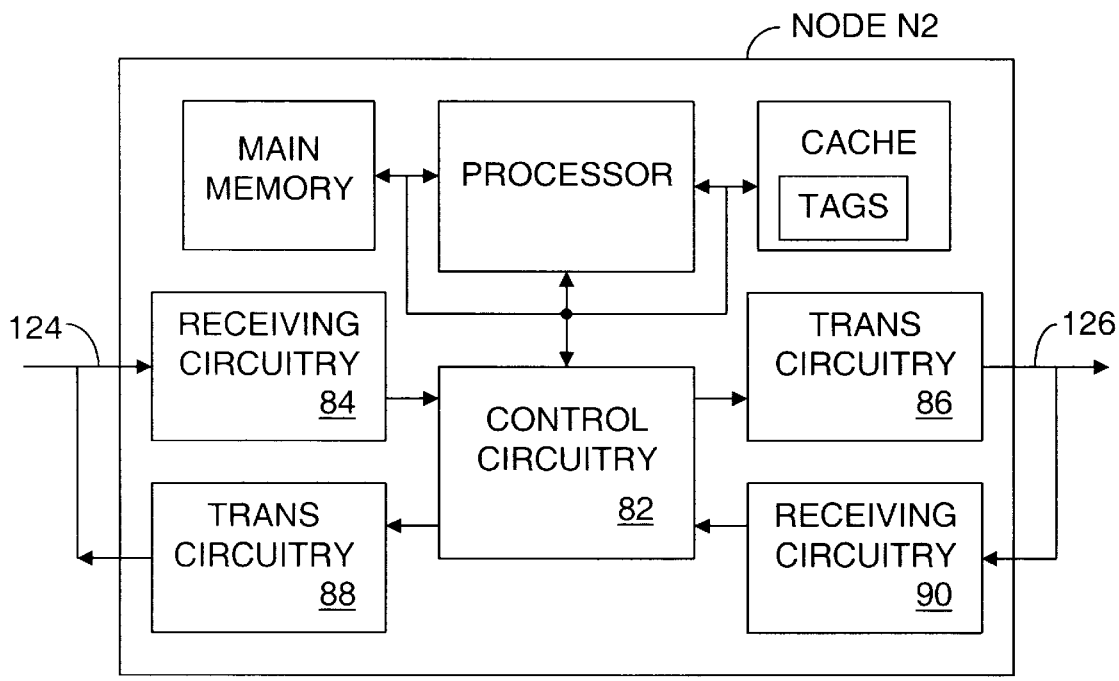
FIG. 15 a schematic representation of certain circuitry in one of the nodes of FIG. 14 in an exemplary embodiment of the invention.

FIG. 14 illustrates a bi-directional ring 120 in which nodes N0 and N1, N1 and N2, N2 and N3, and N3 and N0 are bi-directionally connected through conductors 122, 124, 126, and 128, respectively. As with system 10, different ones of the conductors of conductors 122–128, may be used to carry different kinds of signals. At least some of the bi-directionality is of type (2). Referring to FIG. 15, receiving circuitry 84 and 90 in, for example, node N2 receive signals in different directions, while transmitting circuitry 86 and 88 transmit signals in different directions. Control circuitry 82 may be similar to control circuitry 40 but handle signals in both directions.

The virtual-slot layer and associated activity (e.g., arbitration) may be maintained independently for the two directions. Congestion in one direction need not disrupt ring traffic in the other direction. In some embodiments, when memory consistency requires it, however, nodes may continue to issue their messages in order. Suppose, for example, that a node's first message should be sent clockwise and its second counterclockwise. If the clockwise ring is congested and the counterclockwise is not, the node might not (if ordering is required) attempt to issue the counterclockwise message until the clockwise message is put on the ring.

Circuitry may be included to enable messages (e.g., snoop requests) sent in opposite directions to be ordered consistently. Nodes may maintain a single ordering buffer for both directions. If two directions were perfectly synchronized (probably unrealistic), a fixed positional relationship among slots could be used to ensure all participating nodes process them consistently.

Figure 16:
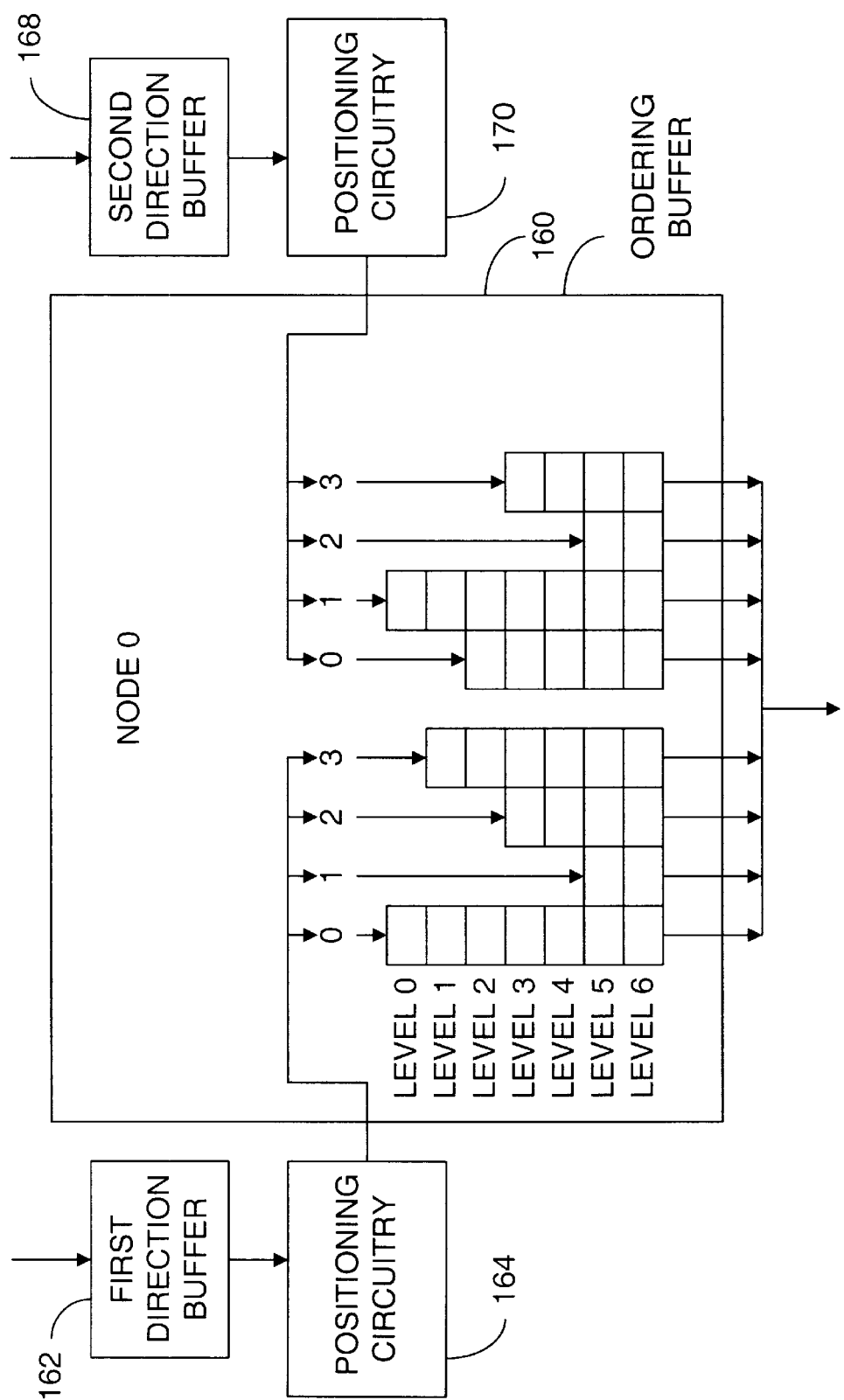
FIG. 16 illustrates skyline diagrams associated with bidirectional transmission.

If the two directions are not perfectly synchronized, the nodes can process request packets as if a specific position relationship existed. Specifically, each node can alternate directions in processing slots. However, if the rings are not perfectly synchronized, arriving slots from the two directions might not alternate. Suppose, for example, that a node receives messages A and C in the clockwise direction consecutively, before message B arrives from the other direction. C should not be placed in the ordering buffer until B arrives. However, it is not feasible for the node to simply hold up the clockwise ring, refusing to forward C (and to accept new clockwise slots) while it is waiting. Instead, it will forward C as usual but, instead of putting it in the ordering buffer, it will put it in a first direction buffer (e.g., a clockwise buffer) and keep it there until B arrives. There will be a corresponding second direction buffer (e.g., a counterclockwise buffer). In one embodiment, one of them is always empty so they can be implemented with the same storage. FIG. 16 illustrates an ordering buffer 160 of, for example, node N0. The operation of order buffering 160 may be illustrated by a skyline diagram for each direction. The two skyline diagrams may have a different appearance as they do in FIG. 16 or the same appearance (e.g., two skyline diagrams 102). First and second direction buffers 162 and 168 provide requests to positioning circuitry 164 and 170 from which they are provided to ordering buffer 160. Other arrangements could be used. Processing circuitry similar to processing circuitry 66 may be included.

If the two directions can get arbitrarily "out of sync" with each other, there may be no way to bound the size of the first and second direction buffers. Thus, it is desirable to bound how much the directions can get out of sync. This can be done by having one of the nodes (e.g., N0)—a master node—regenerate the clock pulses of the two directions consistently once per ring revolution. Although this will not guarantee that the two directions are perfectly synchronized, it will bound how much the directions can drift from each other and thus allows us to bound the size of the clockwise and counterclockwise buffers.

6. Additional Information and Embodiments

There may be intermediate structure (such as a buffer) or signals between two illustrated structures or within a structure (such as a conductor) that is illustrated as being continuous. The borders of the boxes in the figures are for illustrative purposes and not intended to be restrictive. Arrows show certain signal flow in certain embodiments, but not every signal, such as control signals and requests for data.

Ordinarily, where there are no or relatively few empty virtual slots between messages, the global order will be different than the node reception order. However, where messages are spaced sufficiently far apart, the global order may be the same as the node reception order.

In some embodiments, a ring includes only two nodes wherein signals are passed bi-directionally between the nodes (e.g., simultaneously on at least one conductor and/or unidirectionally on more than one conductor).

The invention is not limited to conductors that conduct voltage signals. For example, the conductors may be fiber optic conductors. Two or more of the nodes in a ring may be wirelessly connected through electromagnetic signals.

If the specification states a component, feature, structure, or characteristic "may", "might", or "could" be included, that particular component, feature, structure, or characteristic is not required to be included. Reference in the specification to "some embodiments" means that a particular feature, structure, or characteristic described in connection with the embodiments is included in at least some embodiments, but not necessarily all embodiments, of the invention. The various appearances "some embodiments" are not necessarily all referring to the same embodiments.

As used herein, a bit is "asserted" when it has a certain voltage state or is within a range associated with being asserted and "deasserted" when it has some different state or is within another range associated with being deasserted. An asserted or deasserted bit could be a logic one, a logic zero, VDD/2, or some other value or range of values, depending on the implementation.

A pending request buffer (PRB) may hold requests of a node which have not yet been issued to the nodes own ordering buffer or transmitted to another node.

In some implementations, after requests leave the ordering buffer, they may be stored in an outstanding request buffer (ORB), referred to in Table 6. This buffer may be implemented as a content addressable memory (CAM) that can compare a new request (internal or snoop) against all current entries in a single cycle. This buffer may be used because the cache tags reflect the state of line ownership and responsibility, but not necessarily the presence of data. Once the snoop response for a cache line is received, the requester assumes responsibility for the line, setting it to the M state in the cache. Now assume another BRILO request for the same line arrives and is snooped by the node. The cache line is in the M state and the node will correctly return HITM as the snoop result; however it must not deliver a writeback (WB) for the line until it obtains the data (and uses it, once) for its own (prior) BRILO request. The information about outstanding requests (passed snoop phase and committed for in order completion, but not yet received data) is recorded in the ORB. The ORB and PRB may be presented by boxes in FIGS. 3 and 4 or by additional boxes not illustrated.

In some implementations, to help keep track of data coming back to the node, a node may have a unique static identification (ID) and up to N requests outstanding on the bus (e.g., N=16. An eight bit field for deferred ID, DID[7:0] :={AgentType, AgentID[2:0], ReqID[4:0]}, uniquely identifies each request, and tags the data response for that request.

In some embodiments, if a virtual slot does not include a message, nothing is inserted in the ordering buffer, but the existing messages age. In other embodiments, a bit(s) is inserted into a position in the ordering buffers (where a message would have been placed) and the existing messages age. In still other embodiments, nothing is inserted and the existing messages do not age.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A computer system, comprising:
   nodes connected through conductors, at least some of the nodes each including:
      memory;
      processing circuitry to receive snoop requests in a node reception order and to initiate snoops of the memory in the node before the snoop requests are in a global order; and
      an ordering buffer to receive the snoop requests and provide them at an output of the ordering buffer in the global order.

2. The system of claim 1, wherein after it is determined that a particular one of the snoop requests is in the global order, that snoop request is retired from the ordering buffer, and the nodes including the ordering buffers further include circuitry to determine a snoop result for that snoop request, wherein the snoop result is the same regardless of the node reception order.

3. The system of claim 1, wherein in the nodes that include the ordering buffers further includes circuitry to determine snoop results for the snoop requests after it is determined the snoop requests are in the global order, and wherein the snoop results are the same regardless of the node reception order.

4. The system of claim 1, wherein the memory includes memory cache line coherence state bits for addresses that match addresses in the snoop requests, and the ordering buffer includes positions that hold the snoop requests and ordering buffer cache line coherence state bits corresponding to the snoop requests.

5. The system of claim 4, wherein ordering buffer cache line coherence state bits of later matching requests are passed to earlier matching requests and updated ordering buffer cache line coherence state bits are passed from globally ordered matching requests to later matching requests.

6. The system of claim 4, wherein the memory cache line coherence state bits and the ordering buffer cache line coherence state bits are MESI bits.

7. The system of claim 4, wherein the sources of the ordering buffer cache line coherence state bits depend on whether there are later matching requests.

8. The system of claim 7, wherein if there is no later matching request for a particular new one of the snoop requests, the ordering buffer cache line coherence state bits for that snoop request are a copy of the memory cache line coherence state bits for the corresponding address in memory.

9. The system of claim 7, wherein if there is a later matching request for a particular new one of the snoop requests, the ordering buffer cache line coherence state bits for that snoop request is provided from a copy of the ordering buffer cache line coherence state bits of the closest later matching request.

10. The system of claim 9, wherein the ordering buffer cache line coherence state bits state signal for the later matching request is updated with the result of a cache line coherence function receiving the current state of the ordering buffer cache line coherence state bits of the closest later matching request.

11. The system of claim 10, wherein the cache line coherence function is selected based on a command of the new snoop request.

12. The system of claim 4, wherein after it is determined that a particular one of the snoop requests is in the global order, the ordering buffer cache line coherence state bits of a closest later matching request, if any, of that snoop request is updated with the result of a cache line coherence function receiving the current state of the ordering buffer cache line coherence state bits of the closest later matching request.

13. The system of claim 12, wherein the cache line coherence function is selected based on a command of the snoop request in the global order.

14. The system of claim 1, wherein as a new one of the snoop requests is received by the ordering buffer, the ordering buffer is searched for a closest earlier and closest later snoop request and the new snoop request and the closest earlier snoop request point to each other and the new snoop request and the closet later snoop request point to each other.

15. The system of claim 1, further comprising positioning circuitry to provide the snoop requests to positions of the ordering buffers, and wherein some of the snoop requests are initially positioned in the global order and others of the snoop requests are initially placed in a position that will lead to the global order as additional ones of the snoop requests are received.

16. The system of claim 1, wherein the nodes and conductors form a ring and snoop requests are carried in virtual slots.

17. The system of claim 16, wherein there are additional conductors that are not part of the ring.

18. The system of claim 1, wherein the snoop requests are in a different form in the ordering buffer than they are when received by the processing circuitry.

19. The system of claim 1, further comprising first and second direction buffers to alternate reception of bi-directionally sent snoop requests.

20. The system of claim 1, where in the memory is a cache.

21. A computer system, comprising:
nodes, at least some of the nodes each including:
  memory;
  processing circuitry to receive a new snoop request and other snoop requests in a node reception order and to initiate a snoop of the memory in the node with respect to the new snoop request before the new snoop request is in a global order;
  an ordering buffer to receive the new snoop requests and other snoop requests and provide the new snoop request at an output of the ordering buffer in the global order; and
  positioning circuitry to position the new snoop request and the other snoop requests in the ordering buffer.

22. The system of claim 21, wherein the new snoop request may be initially positioned in the ordering buffer in the global order or initially placed in a position in the ordering buffer that will lead to the global order as additional ones of the other snoop requests are received by the ordering buffer.

23. The system of claim 21, wherein in the nodes that include the ordering buffers further includes circuitry to determine a snoop result for the new snoop request after it is determined that that new snoop requests is in the global order, and wherein the snoop result is the same regardless of the node reception order.

24. The system of claim 21, wherein the nodes are connected through conductors to form a ring.

25. A method for determining snoop results of snoop requests received by different nodes in different node reception orders, comprising:
  receiving the snoop requests by different ones of the nodes in different ones of the node reception orders;
  initiating snoops of memory of the respective nodes before the snoop requests are in a global order;
  positioning the snoop requests in ordering buffers of the respective node;
  advancing the snoop requests in the ordering buffers as necessary until the snoop requests are in the global order.

26. The method of claim 25, further comprising holding the snoop requests in direction buffers to maintain alternate reception of bi-directionally sent snoop requests.

* * * * *